3,498,182
LOCKING CYLINDER
Harvey I. Sheffer and Donald A. Selke, Cincinnati, Ohio, assignors to The Sheffer Corporation, Cincinnati, Ohio, a corporation of Ohio
Filed May 7, 1968, Ser. No. 727,184
Int. Cl. F15b 15/26
U.S. Cl. 91—44          5 Claims

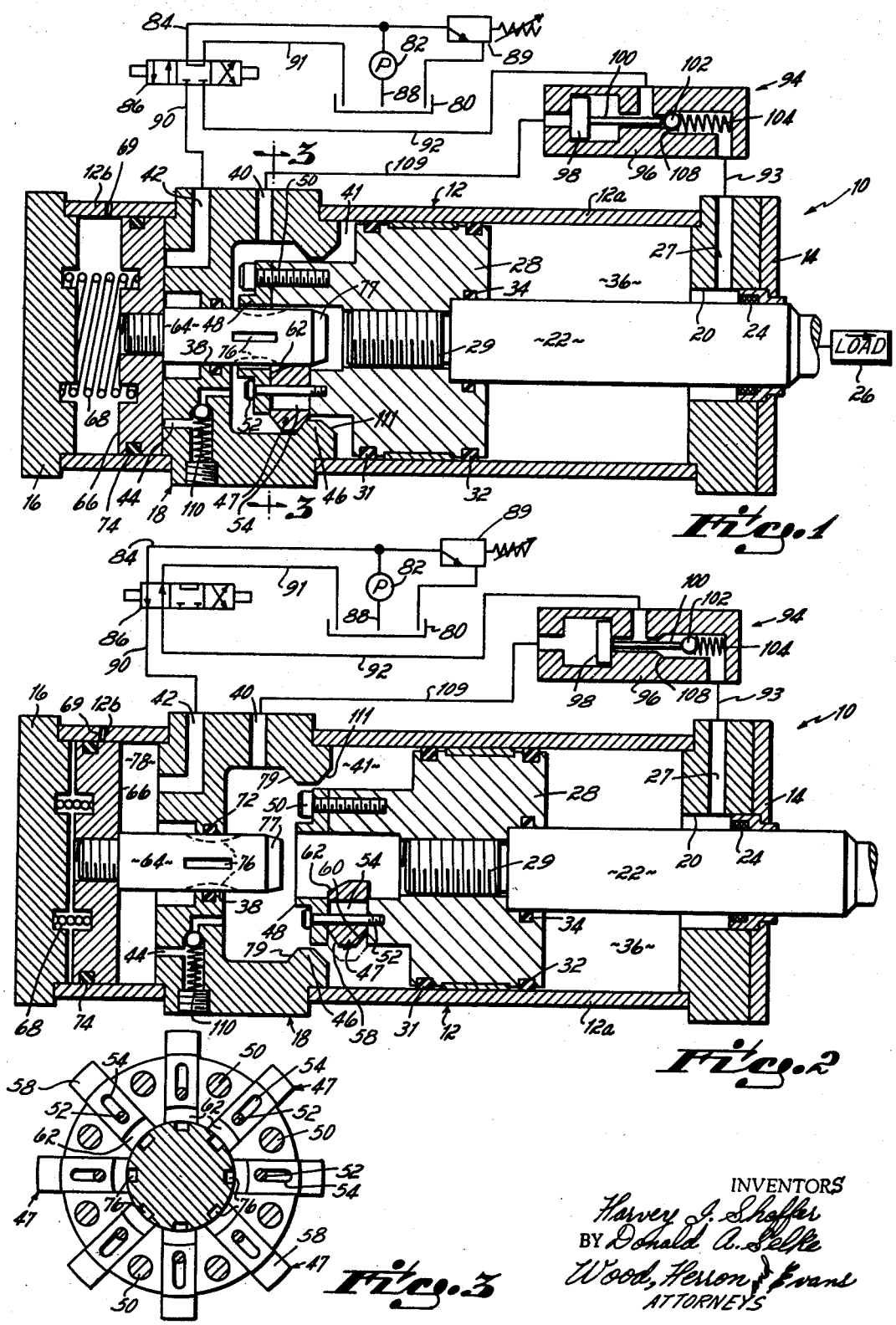

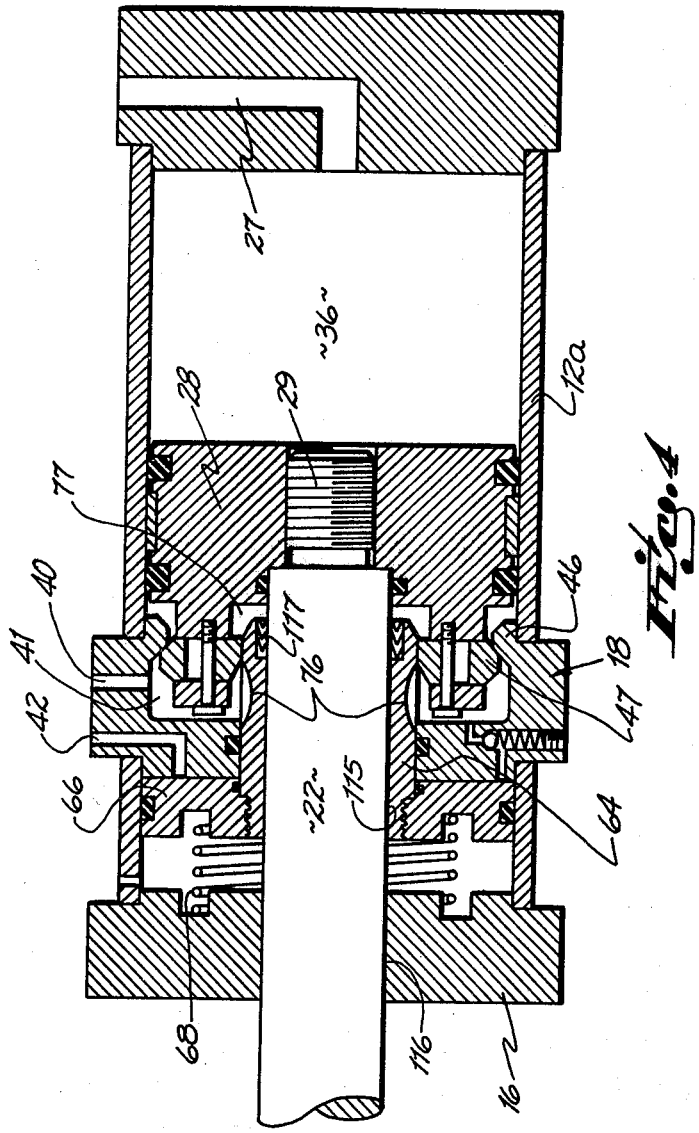

ABSTRACT OF THE DISCLOSURE

A locking cylinder for mechanically locking a piston rod in predetermined position. Movable locking members are cammed into locking position with respect to the main or work piston, by a secondary or locking piston. The locking piston holding the members in locking position is hydraulically or pneumatically withdrawn from engagement with the members before fluid pressure is applied to move the work piston from the pretermined position in which it was locked. Application of pressure to move the work piston is automatically valved, in accordance with movement of the locking piston, to commence only after the members are relieved of load.

---

This invention relates to a piston rod and cylinder assembly having structure for locking the rod in a predetermined position.

Locking cylinders wherein a piston rod can be mechanically locked in a retracted or extended position are used where the rod must remain in a desired position for an extended period without actuating pressure to hold it in that position. Such assemblies are used, for example, on aircraft landing gear to lock the wheels in extended position. The catastrophic results attendant a failure can be imagined. They also permit the wheels to be held in retracted position without the constant application of fluid pressure to hold them in that position. Locking cylinders have been used in connection with the auxiliary propellers which are being mounted on large ships for use in docking. The propeller must remain housed within the hull, except when required in docking. The cylinders are used in a wide variety of applications, including most recently antenna raising and locking equipment, and in missile silo doors.

Locking cylinders of the past have often been deficient in the rapid wear of the interlocking elements, especially where the locking is carried out under load, for example, where a rod is locked or unlocked while it is supporting a heavy weight. In such conditions critical locking parts have been subject to forces which have hastened wear and caused frequent replacement.

It is a principal objective of our invention to provide improved locking structure for a locking cylinder which is more reliable and longer wearing. In accomplishing this objective, it has been another objective to provide locking structure in which neither hydraulic load nor mechanical load is applied to the movable locking elements until the elements are free to move to unlocked positions.

We have invented locking structure for a locking cylinder which minimizes wear under load, is not highly complex to manufacture, long lasting and reliable, and which obviates the problem of sticking or jamming under load that attended use of prior art devices.

In the structure of this invention, locking members are mounted for radial movement between a lock position and an unlock position, to engage and pass, respectively, a locking abutment with respect to which the members are moved relatively in the axial direction. The locking abutment presents a surface behind which the members engage when in the lock position. The abutment is cleared by the members when they are in their unlock positions. The abutment also can cam the members to unlock position when the members are relatively moved axially past the abutment in either direction.

A locking piston is slidable axially relative to the working piston, and has a surface which can engage the members to move and hold them in the locked position. The locking piston engages and holds the members in locking position only when the work piston is at a predetermined position at which the rod carried by it may be extended, retracted, or at any preestablished intermediate position. Valve means which are preferably defined in part by the locking piston apply pressure fluid to move the work piston from the predetermined position of locking, only after the locking piston has been moved out of engagement with the members so that the members are relieved of load and can then gently be cammed to unlocked position as the working piston moves.

A further description of our invention will now be provided in connection with the drawings wherein:

FIGURE 1 is a schematic diagram of a hydraulic circuit in which a preferred form of locking cylinder in accordance with this invention is included, the locking cylinder being illustrated in axial section with the work piston and rod locked in retracted position;

FIGURE 2 is similar to FIGURE 1 but shows the work piston in unlocked condition and being extended;

FIGURE 3 is a cross-sectional view of the work piston and locking shoes, taken along line 3—3 of FIGURE 1; and FIGURE 4 is an axial section of a modified form of the invention, for locking the piston in extended position.

CYLINDER AND WORK PISTON

Referring now to FIGURE 1, the cylinder generally designated by the number 10 includes a side wall 12, an end wall 14 at the work end of the cylinder, and a head cap or end wall 16 at the head of the cylinder. The side wall 12 is comprised of two axially aligned but spaced sections 12a and 12b, and between them is a divider or block 18. The cylinder wall sections 12a and 12b, end walls 14 and 16, and divider 18 are connected and sealed by suitable means, not shown.

The work end wall 14 has a central opening 20 through which the work piston rod 22 extends. A sliding seal 24 is provided around rod 22 at opening 20 to prevent pressure fluid from escaping from the work end of cylinder 10. Pressure fluid is supplied through a retract port 27 into a chamber 36 at the work end of the cylinder 10.

Rod 22 is shown as connected to an external load illustrated diagrammatically by the number 26. For purposes of explanation it is assumed that the load constantly exerts a force (which may simply be a weight load) on rod 22 tending to extend it, as indicated by arrow on the load in FIGURE 1. This is a condition frequently experienced, as for example where the cylinder 10 is vertically mounted.

In cylinder 10, rod 22 is connected at 29 to a work piston 28. Piston 28 is slidable in cylinder section 12a, its retracting movement being limited by divider 18. Suitable sliding seals are provided at 31 and 32 between piston 28 and wall 12a, and an O-ring seal 34 is provided between the piston and rod 22. Thus the pressure chamber 36 is defined between end wall 14 and piston 28.

Cylinder divider 18 includes a central bore 38, and has fluid pressure conduits or passageways 40, 42 and 44. Passageway 40 communicates with the cylinder chamber 41 which is between piston 28 and divider 18, while passageway 42 is an extend port that communicates with the cylinder section 12b on the other side of the divider. Passageway 44 communicates between the opposite sides of the divider and includes a one-way valve to be described. Divider 18 also includes an annular locking projection or abutment 46, more fully discussed below.

LOCKING MECHANISM

At least one and preferably several locking members which may be shoes or dogs as shown at 47 are secured to head side of work piston 28. Each shoe is independently slidable over a limited radial distance as indicated by the dotted line in FIGURE 2. The locking shoes 47 are loosely sandwiched between a retainer ring 48 and the piston 28, bolts 50 connecting ring 48 to the piston. Limited motion permitting means such as bolts 52 and slots 54 slidably secure the shoes 47 to piston 28, the bolts 52 extending through the elongated slots 54 in locking shoes 47 and into piston 28. Locking shoes 47 can slide between a radially extended position shown in FIGURES 1 and 3 and a radially withdrawn position shown in FIGURE 2, as limited by the length of the slots 54.

Each locking shoe 47 has three cam surfaces: outer, retract and extend cam surfaces 58 and 60 respectively, which face oppositely, and a locking rod cam surface 62 on the inner end. While FIGURE 3 shows eight locking shoes 47, more or less can be provided depending on the load and available space. The locking members may alternatively be dowel pins, balls, or be otherwise shaped to lock with the abutment.

The locking shoes 47 can assume two different radial positions in operation of our locking mechanism. In the locking position illustrated in FIGURE 1 they prevent rod 22 from extending because they abut or are engaged behind the locking projection 46, and they are prevented from passing it by a locking rod 64, to be described. Locking shoes 47 are also slidable into the unlocked position illustrated in FIGURE 2, in which position they clear the locking projection 46.

The radial position of the locking shoes 47 is controlled in part by locking rod 64. This locking rod is connected to a locking piston 66 which is slidable in bore section 12b, axially toward and away from the work piston 28. Locking rod 64 extends through divider bore 38, and can be received in a central recess 67 in work piston 28. Rod 64 is sealed to bore 38 by a seal at 72.

The locking piston is biased toward the limiting position shown in FIGURE 1 by biasing means such as the mechanical spring 68. This spring is positioned between the head plate 16 and the locking piston 66 by an annular groove in head plate 16 and in the locking piston. Gasket 74 blocks the passage of pressure fluid past the locking piston 66. The spring chamber is vented to atmosphere through a breather port 69.

The flow of fluid into chamber 41 is timed through one or more automatically valved pressure fluid passageways which preferably are in the form of slots 76 in locking rod 63 (see FIGURE 3). These passageways are arcuate slots cut longitudinally in the locking rod 64, and they are positioned or timed to provide a fluid flow path from one side of divider 18 to the other side over a limited range of positions of locking rod 64, to be described. The end of the locking rod is bevelled to provide a cam surface 77 for cooperating with the shoe cam surfaces 62 to cam the shoes outwardly.

Locking rod 64 is movable between two limits or positions during the operation of the locking mechanism. FIGURE 1 shows the locking rod 64 in locking position. In this position it holds or cams the locking shoes 47 outwardly in their locked (radially extended) positions, by engaging their inner ends. With the locking shoes in this position rod 22 is locked in the retracted position since the shoe cam surfaces 60 are positively engaged behind the cam surface 79 on locking projection 46.

The other limiting position of locking rod 64 is shown in FIGURE 2, in which it no longer engages the locking shoes 47 or prevents their inward movement. This is referred to as the unlocked position, since the rod 22 is free to extend if pressure is released from chamber 36 and applied to chamber 41.

HYDRAULIC OPERATING APPARATUS

The locking cylinder is described herein for purposes of illustration primarily in relation to a hydraulic system, but it can also be utilized in a pneumatic system.

The illustrative hydraulic system shown includes a fluid reservoir 80 and a pump 82 connected by line 84 to a conventional solenoid or manually operated, open center, four way valve 86. Pump 82 receives fluid from reservoir 80 by line 88. A conventional pressure relief valve 89 is connected in the hydraulic line 84 to return excess pressure fluid to reservoir 80. A line 90 connects one work port of valve 86 to the extend port 42 of the cylinder that communicates with the locking piston pressure chamber 78. Hydraulic line 91 connects the tank port of four way valve 86 to the reservoir 80.

Hydraulic line 92 connects a second work port of valve 86 to a pilot operated check valve 94 and line 93 connects the outlet side of valve 94 to retract port 27 which leads to pressure chamber 36.

The pilot operated check valve 94 includes a cylinder 96, a piston 98 slidable in cylinder 96, a rod 100 connected to the piston, a ball 102 and a spring 104 which urges the ball 102 toward its seat 108. When piston 98 is not exposed to actuating pressure in line 109, this one way valve prevents flow of fluid out of chamber 36. When pressure is applied through line 109 to piston 98, rod 100 pushes ball 102 off seat 108, and fluid can flow from chamber 36 through valve 94 to hydraulic line 92. Pressure fluid can flow from line 92 to line 93 regardless of the pressure on piston 98.

Fluid pressure conduit 44 in divider 18 includes a one way or check valve 110 which permits pressure fluid to flow from chamber 41 to chamber 78, but prevents pressure fluid from flowing in the reverse direction, from chamber 78 to chamber 41.

Fluid pressure can also flow between chamber 78 and chamber 41 through the fluid pressure passageways or slots 76 at certain controlled times during the operation of the cylinder-extensible rod assembly. The passageways are positioned and dimensioned to connect chamber 78 to chamber 41 only when locking rod 64 is in an unlocked position, that is, when it does not block radial inward movement of shoes 47. In this sense the valve is a sequencer or timing valve, and it applies pressure to extend the rod only when rod 22 is unlocked and can be extended.

OPERATION

A description of how our invention operates will now be given. When the rod is to be unlocked and extended from its locked position shown in FIGURE 1, valve 86 is operated to provide the interconnections shown in FIGURE 2, so that pressure fluid from pump 82 is applied to the extend port 42, and line 91 is connected to tank 80.

In the assumed initial locked position, spring 69 holds locking position 66 against divider 18, and locking rod 64 blocks inward movement of shoes 47. In this condition, application of relative pressure to chamber 78 moves the locking piston and rod away from divider 18, that is, to the left as shown in FIGURE 2. At this time no pressure is applied into chamber 41, since check valve 110 blocks such flow from chamber 78 and passages 76 do not initially interconnect to chamber 78. Hence, no fluid pressure forces act on work piston 28 tending to extend rod 22. This is a significant feature of our invention since it prevents undesirable hydraulic forces from being applied to the locking shoes 47. Moreover, fluid in chamber 36 is trapped by check valve 94, and that pressure force supports the load 26, so that shoes 47 are not heavily mechanically loaded.

When the locking rod 64 has moved sufficiently toward the left, or away from work piston 28, the rod 64 is carried out of proximity to the locking shoes 47, and the locking shoes are then able to move inwardly. At this point—just after the rod cam surface 77 is aligned with the shoe cam surfaces 62—slots 76 come into communication with chamber 78 and pressure fluid pressure is admitted through them into chamber 41. This pressure acts on work piston 28 and starts to extend it. This pressure also acts on check valve piston 98 through port 40 and line 109 to extend it, opening valve 94 so that fluid can be expelled from chamber 36.

As work piston 28 is moved to the right, the cam surfaces 60 of the locking shoes 47 slide on the camming surfaces 79 of projection 46 so that the shoes are gently cammed inwardly to clear the projection 46, as they have in FIGURE 2.

As fluid pressure continues to be introduced into chamber 41, rod 22 is progressively moved until it is in its fully extended position.

The retraction and locking of the rod 22 shall now be described. Four-way valve 86 is operated so that pressure fluid is applied through line 92, past check valve 94 and through the retract port 27 into chamber 36. This pressure acts on work piston 28 urging it to the left. Fluid is expelled from chamber 41 past check valve 110 into chamber 78, and from chamber 78 through port 42 to tank 80.

As the retraction of rod 22 continues, the locking shoes 47 approach the projection 46 from the right, and they are cammed inward by the cam surfaces 111 on the projection 46, which cooperate with the retract cam surfaces 58 on the shoes. Hence, the shoes can pass the projection.

When the point is reached at which the locking shoes 47 engage the cam surface 77 on locking rod 64, continued movement of piston 28 causes the shoes to be cammed outwardly by locking rod taper 77, so that the shoes are moved into their locking positions behind projection 46. Spring 68 holds the locking piston in its locking position. Movement of piston 28 stops when it abuts divider 18. When this has been accomplished, the extensible rod 22 is locked and the cycle has been completed. At this time the pump 82 can be shut down since no pressure is needed to keep the rod 22 locked in retracted position. The cylinder will, of course, remain locked even if pressure should fail.

It should be noted that the pilot operated check valve 94 is not a necessary element of the circuit; for example, it serves no purpose when the system is pneumatically operated, or when no load acts on the locking mechanism in retracted position. When valve 94 is not used, port 40 can be eliminated and line 92 would simply be connected directly to port 27.

In the embodiment of the invention which is shown in FIGURES 1-3, the work piston and rod are locked in a predetermined retracted position. However, as earlier suggested, in other circumstances, it may be desirable to provide a locking cylinder in which the piston is locked in extended position.

FIGURE 4 hereof shows one embodiment of the invention wherein the rod 22 is locked in extended position. As can be seen, this is accomplished by reversely orienting the rod 22 with respect to the working piston 28 to which it is mounted at 29. Thus in the embodiment of FIGURE 4 the rod 22 extends through and slides in an axial bore 115 in locking rod 64, and through an axial bore 116 in end plate 16. Rod 22 is sealed for sliding movement relative to locking rod 64, by sealing means designated at 117. Operation of this embodiment of the invention is similar to that already described in connection with the embodiment of FIGURES 1-3, except that by reason of the reverse orientation of the rod 22, when the piston 28 is locked the rod is in extended position rather than in the retracted position previously discussed.

From the disclosure herein, those skilled in the art will further understand that the relative positions of the locking members 47 and the abutment 46 can be reversed without departure from the invention. That is, instead of mounting the members 47 to piston 28 for axial movement therewith, the members 47 can be mounted to the cylinder 12 or to the divider 18, for radial movement relative thereto, and the abutment 46, rather than being fixed in position with respect to the cylinder, can be provided as a part of piston 28 or rod 22. In other words it is only necessary that there be relative axial movement between the members 47 and the abutment 46, and that the members be movable in the radial direction between lock and unlock positions, with respect to the abutment, in response to axial movement of the locking piston. Where the members 47 are carried by the divider or the cylinder, they are cammed in the radial direction from unlocked position to locked position, by cammed coaction with the locking rod. It will further be apparent that, if desired, the members 47 can be cammed radially inward toward a locked position, rather than cammed outward to locked position, as in the embodiment shown.

From the foregoing, it can be seen that the locking mechanism provides a timed or valved sequential application of pressures, so that the work piston and rod can be locked and unlocked while no heavy loads are acting on the locking shoes.

We claim:
1. A locking cylinder comprising,
a cylinder having a work piston movable therein, said piston operating a piston rod,
at least one locking member mounted for radial movement relative to said cylinder between lock and unlock positions,
means presenting a locking abutment engageable in piston locking relation by said member when said member is in lock position but which does not block said member when said member is relatively moved axially past said abutment while in unlock position, said abutment being shaped to cooperate with said member to apply a radial camming force to said member if said member is moved relatively past said abutment when in lock position,
one of said member and said abutment being carried by said piston for axial movement therewith and the other of said member and abutment being mounted to said cylinder,
a locking piston slidable in a locking piston chamber at one end of said cylinder in axial alignment with said work piston for movement axially toward and away from said work piston,
a divider wall mounted in said cylinder between said locking piston and said work piston, said divider wall blocking pressure in said locking piston chamber from exerting force tending to move said work piston,
said locking piston including a locking rod extending through said divider wall,
camming means on said locking rod and engageable with said member as said locking piston is moved axially toward said work piston to cam said member to said lock position and positively hold said member in said position,
means biasing said locking piston toward said work piston,
a fluid passageway for admitting pressure fluid into said locking piston chamber to move said locking piston away from said work piston,
a passage for applying pressure fluid to said work piston, said passage means including timed valve means opening to permit application of said pressure fluid to said work piston only when said locking piston is sufficiently far from said work piston that said camming means do not block radial movement of said member to unlock position.

2. A locking cylinder in accordance with claim 1 wherein said valve means is defined in part by means formed in said locking rod and in part by said divider wall.

3. A locking cylinder in accordance with claim 2 wherein said valve means comprises a channel in said locking rod for the flow of fluid from said locking piston chamber to said work piston.

4. A locking cylinder in accordance with claim 1 wherein said locking member is mounted to said work piston for radial movement relative thereto, and wherein a stop is provided which prevents contact between said locking member and said cylinder except at said abutment.

5. A locking cylinder in accordance with claim 1 wherein said piston rod extends axially through said locking piston.

References Cited

UNITED STATES PATENTS

| | | | |
|---|---|---|---|
| 2,130,618 | 9/1938 | Gnavi | 91—44 |
| 2,181,562 | 11/1939 | DeGanahlet et al. | 91—44 X |
| 2,349,244 | 5/1944 | Brown | 91—44 |
| 2,401,407 | 6/1946 | Benbow et al. | 92—24 X |
| 3,008,454 | 11/1961 | Wilkins | 91—44 X |

FOREIGN PATENTS

| | | |
|---|---|---|
| 725,770 | 9/1942 | Germany. |
| 565,127 | 10/1944 | Great Britain. |
| 48,981 | 8/1917 | Sweden. |

MARTIN P. SCHWADRON, Primary Examiner

I. C. COHEN, Assistant Examiner

U.S. Cl. X.R.

92—24

UNITED STATES PATENT OFFICE
CERTIFICATE OF CORRECTION

Patent No. 3,498,182     Dated March 3, 1970

Inventor(s) Harvey I. Sheffer and Donald A. Selke

It is certified that error appears in the above-identified patent and that said Letters Patent are hereby corrected as shown below:

Column 3, line 55, change "63" to --64--

Column 4, line 58, change "position" to --piston--

SIGNED AND
SEALED
AUG 18 1970

(SEAL)
Attest:

Edward M. Fletcher, Jr.
Attesting Officer

WILLIAM E. SCHUYLER, JR.
Commissioner of Patents